(12) United States Patent
Selvin et al.

(10) Patent No.: US 9,167,095 B1
(45) Date of Patent: Oct. 20, 2015

(54) CALL CENTER AGENT MANAGEMENT

(71) Applicant: Verizon Patent and Licensing Inc., Arlington, VA (US)

(72) Inventors: Albert M. Selvin, Pawling, NY (US); Manah M. Khalil, Coppell, TX (US); Senthil Muthusamy, Lewisville, TX (US); Phillip W. Melancon, Flemington, NJ (US); Somesh Sharma, Flower Mound, TX (US); Mohammad Salman, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/296,933

(22) Filed: Jun. 5, 2014

(51) Int. Cl.
*H04M 3/00* (2006.01)
*H04M 5/00* (2006.01)
*H04M 3/51* (2006.01)

(52) U.S. Cl.
CPC .................................. *H04M 3/5175* (2013.01)

(58) Field of Classification Search
CPC ... H04M 3/51; H04M 3/5183; H04M 3/2218; H04M 3/2281; H04M 3/5175

USPC ............ 379/265.06, 265.05, 265.01, 265.03, 379/265.11, 265.09
See application file for complete search history.

(56) References Cited

U.S. PATENT DOCUMENTS

| | | | | |
|---|---|---|---|---|
| 8,411,841 | B2* | 4/2013 | Edwards et al. | 379/265.05 |
| 2014/0254787 | A1* | 9/2014 | Slovacek | 379/265.06 |
| 2014/0362984 | A1* | 12/2014 | Danson et al. | 379/265.06 |

* cited by examiner

*Primary Examiner* — Thjuan K Addy

(57) ABSTRACT

Call center personnel, i.e., company agents may be monitored and information from monitoring the call center agents may be presented on a portable device. The information from monitoring the call center agents may include various key performance indexes (KPIs) that enable the performance of the call center agents to be assessed. The KPIs may be updated in near-real time based on monitoring pending calls handled by the agents. Sound analytics may also be performed on the calls. Information regarding the call center agents may be graphically organized by the portable device so that call centers agents who may need assistance may be easily identified. The portable device may join a call. For example, a setting for a session associated with the call may be modified to include the manager device in the session.

20 Claims, 13 Drawing Sheets

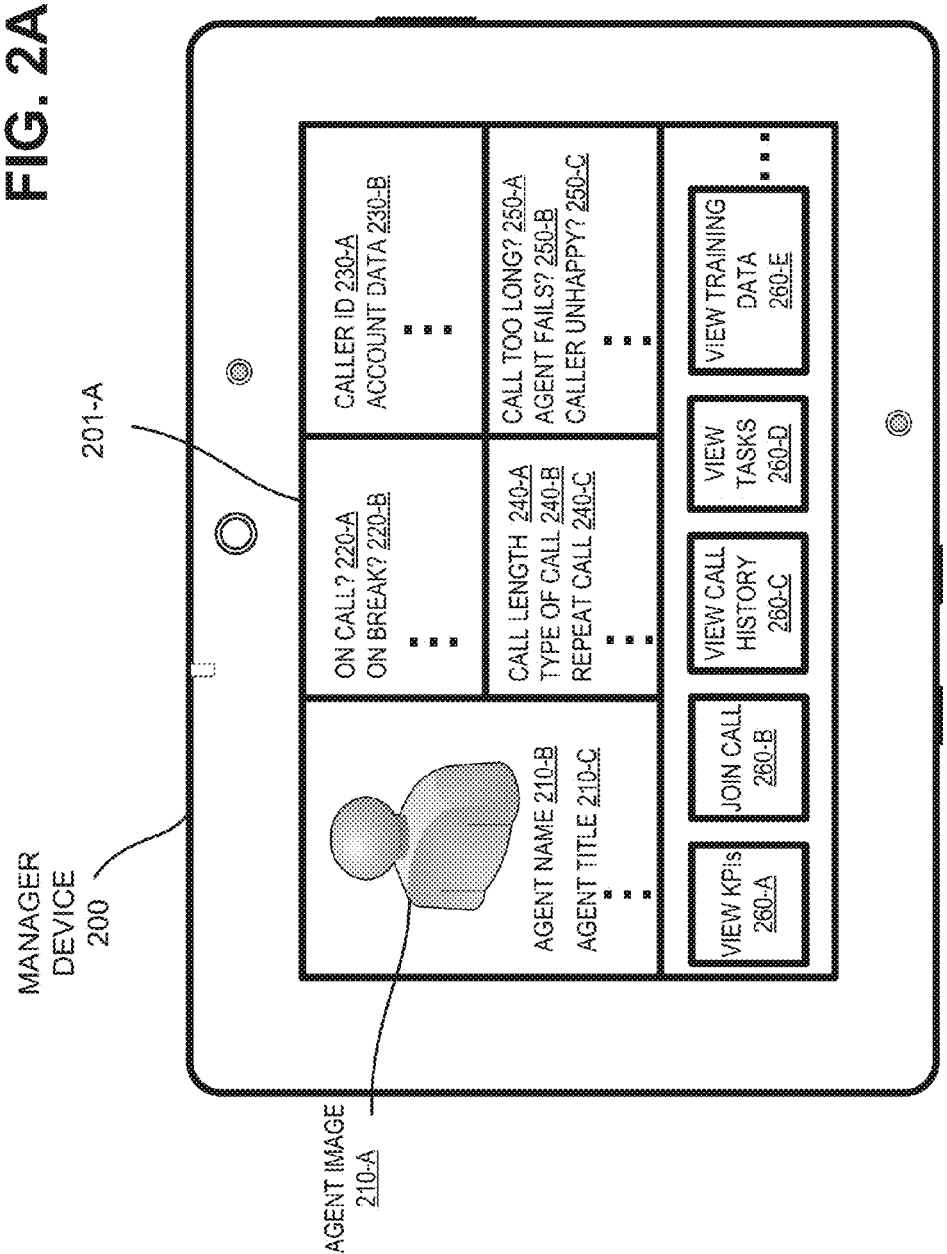

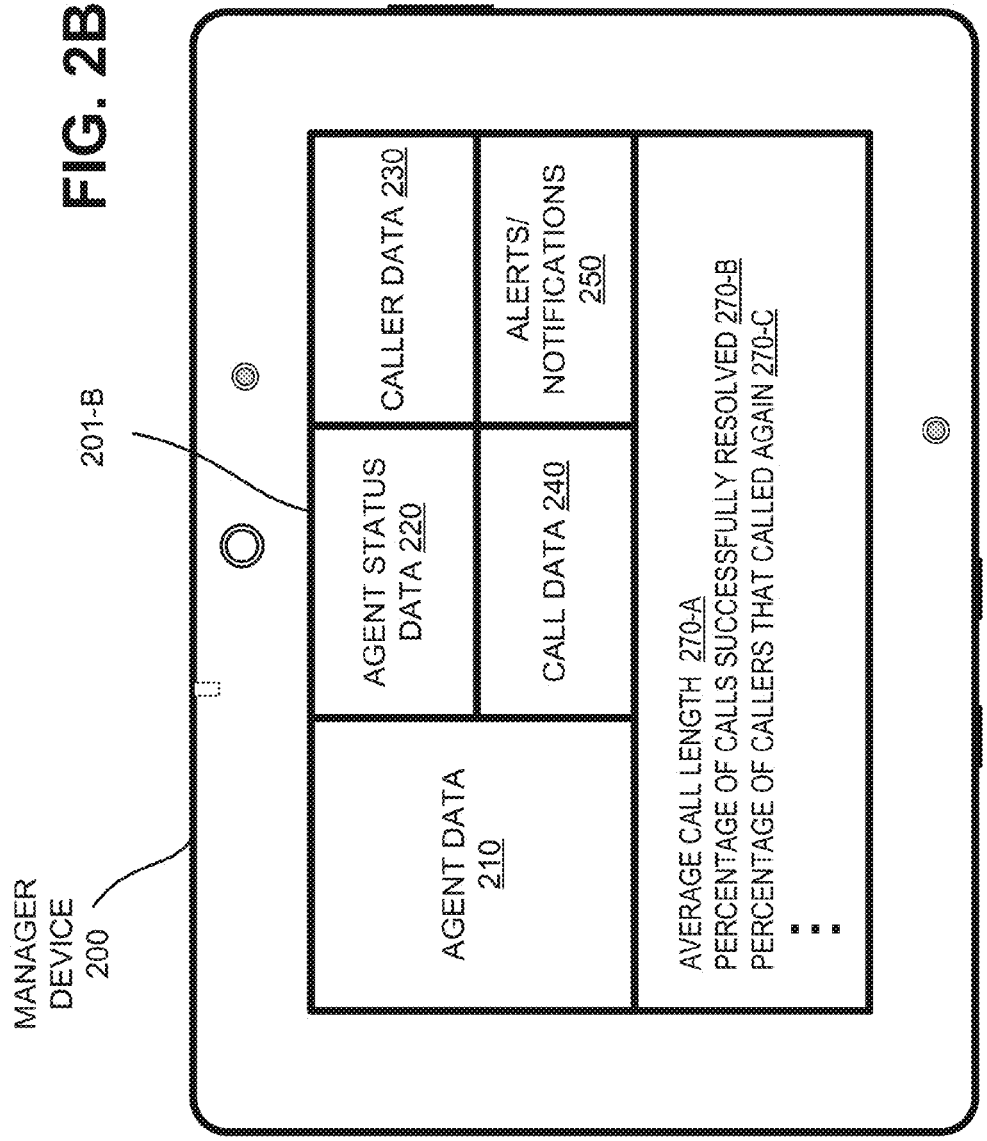

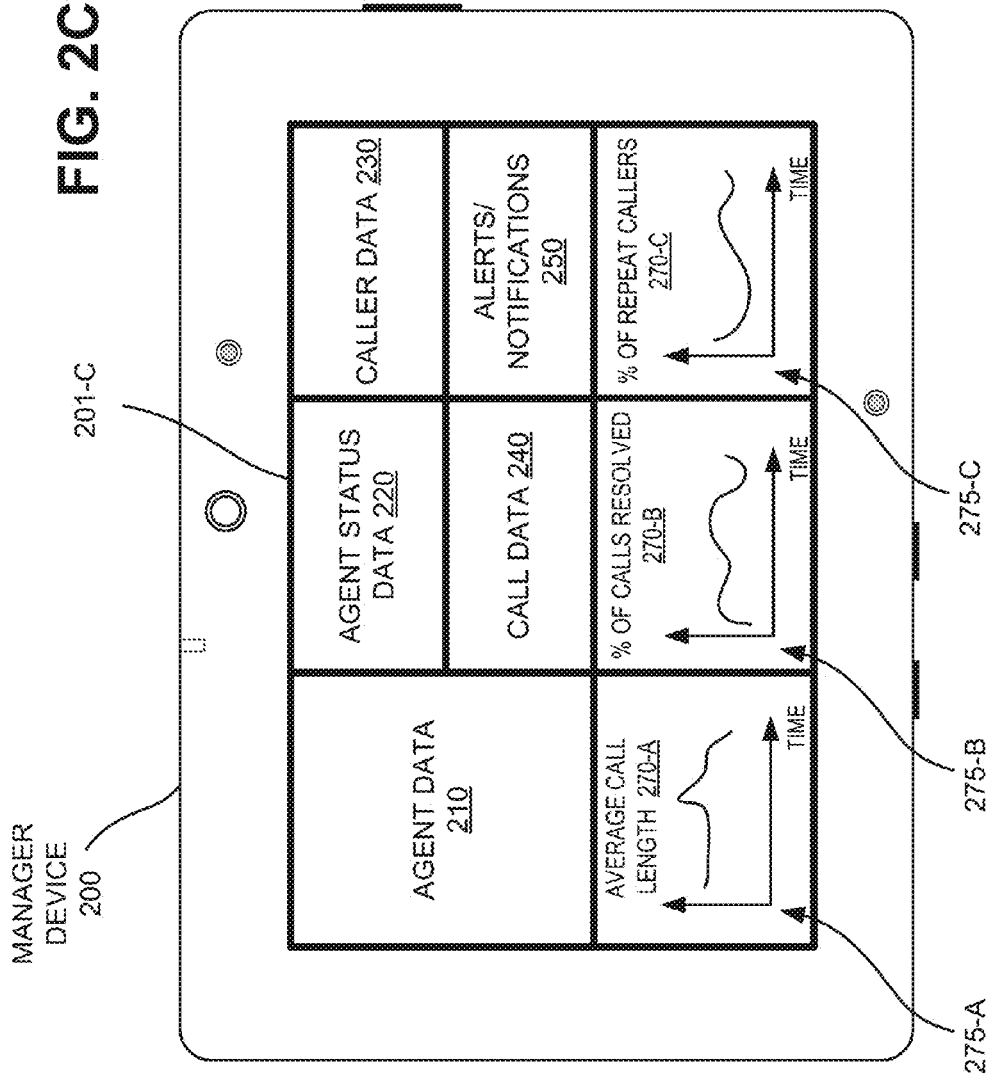

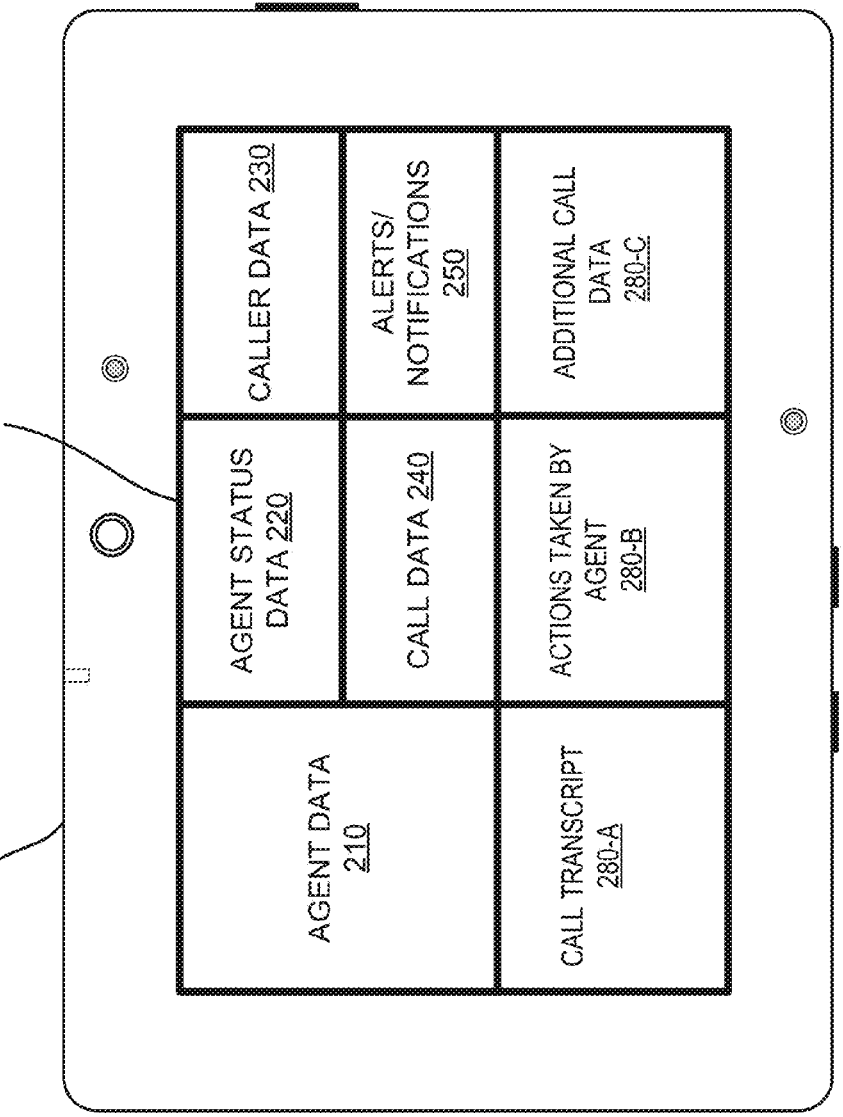

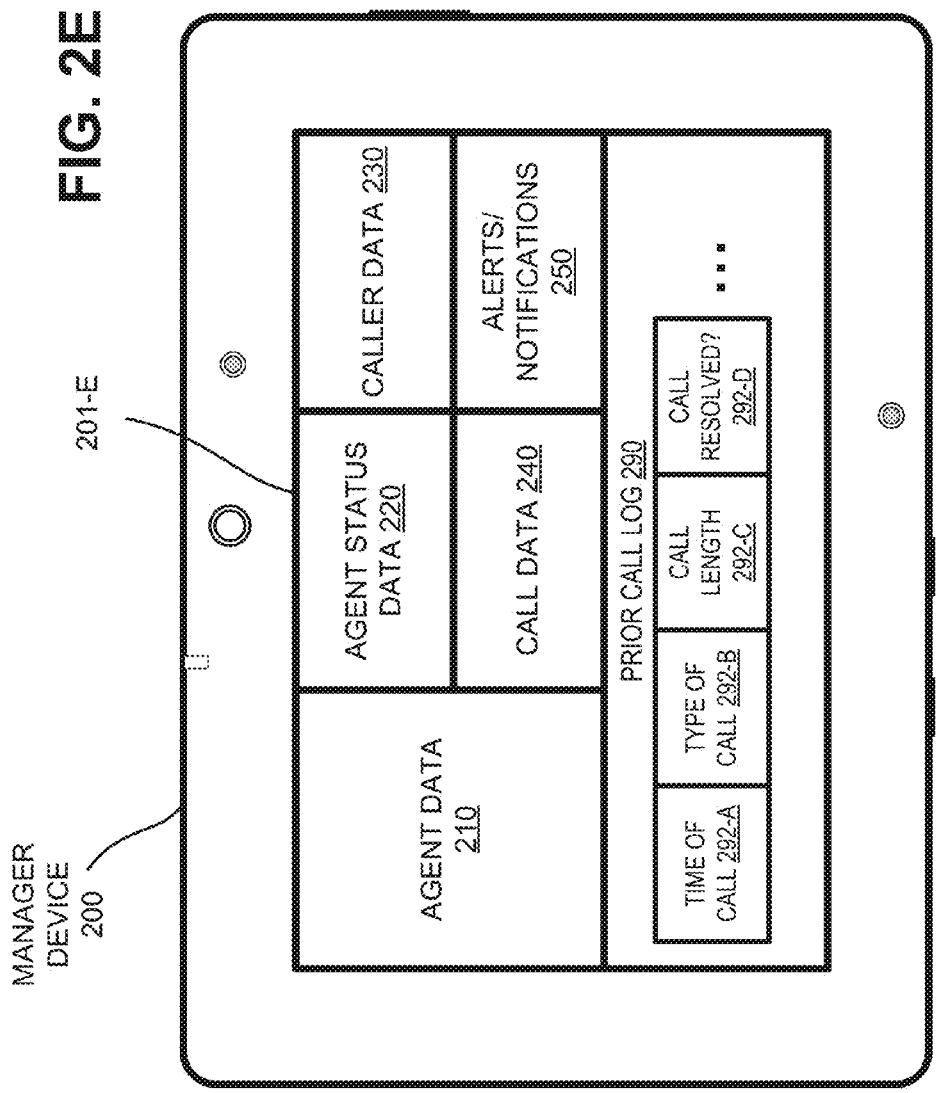

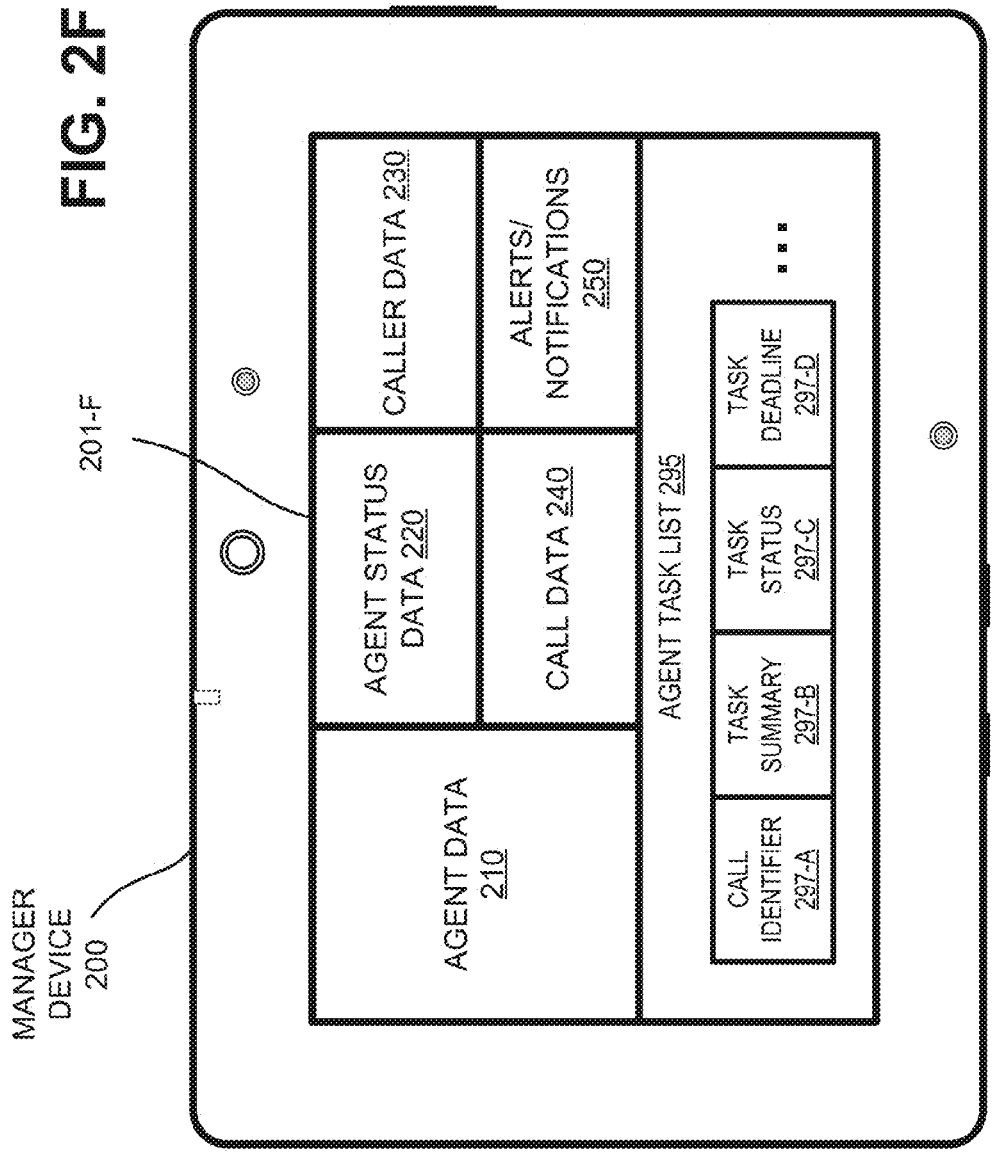

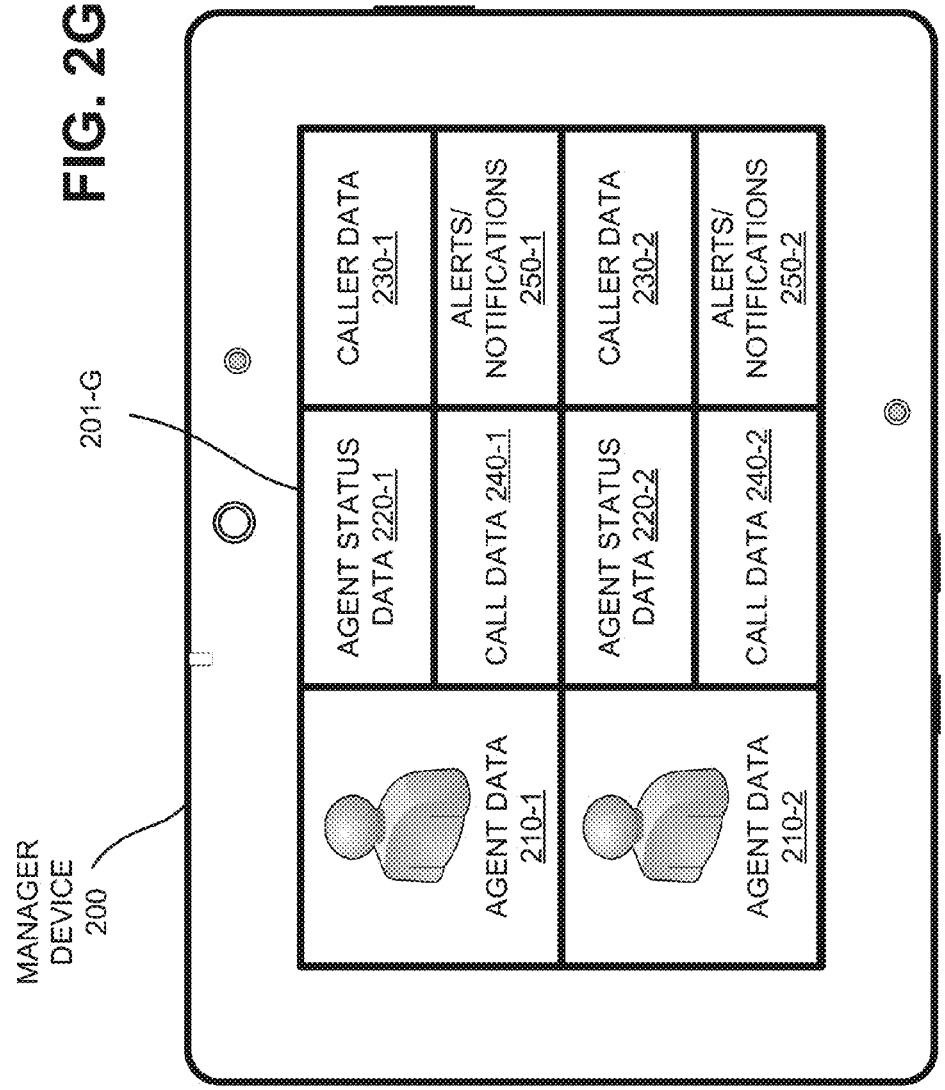

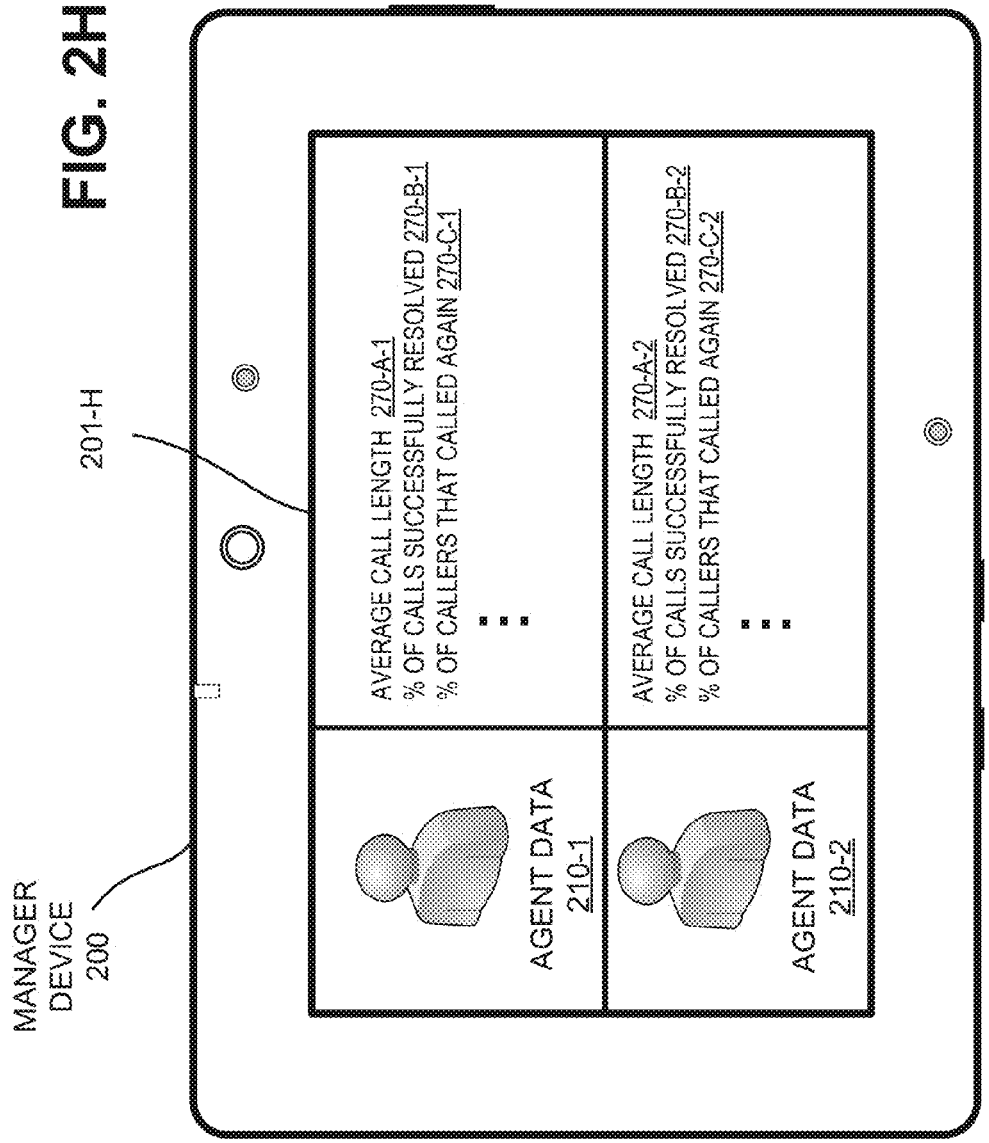

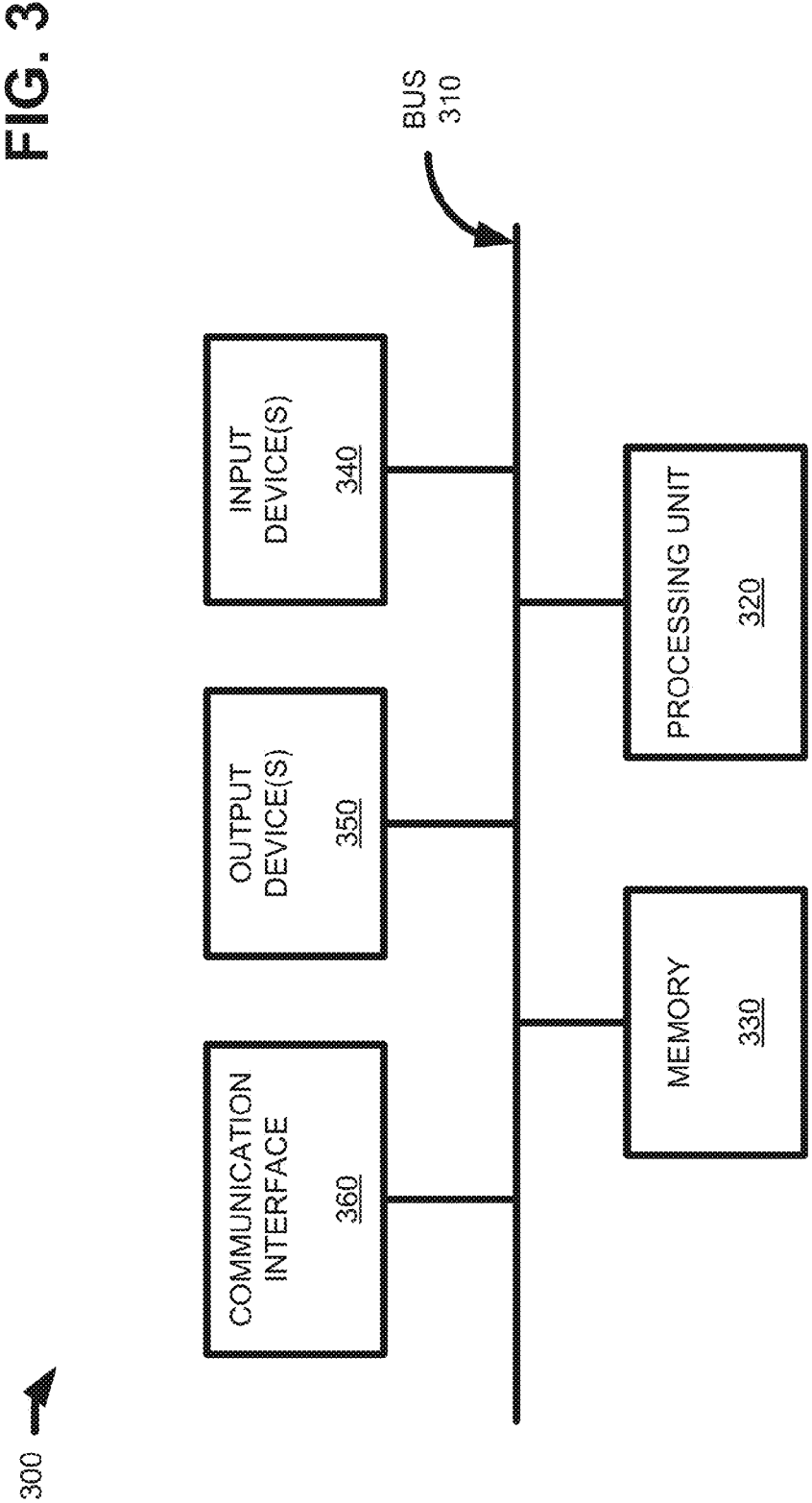

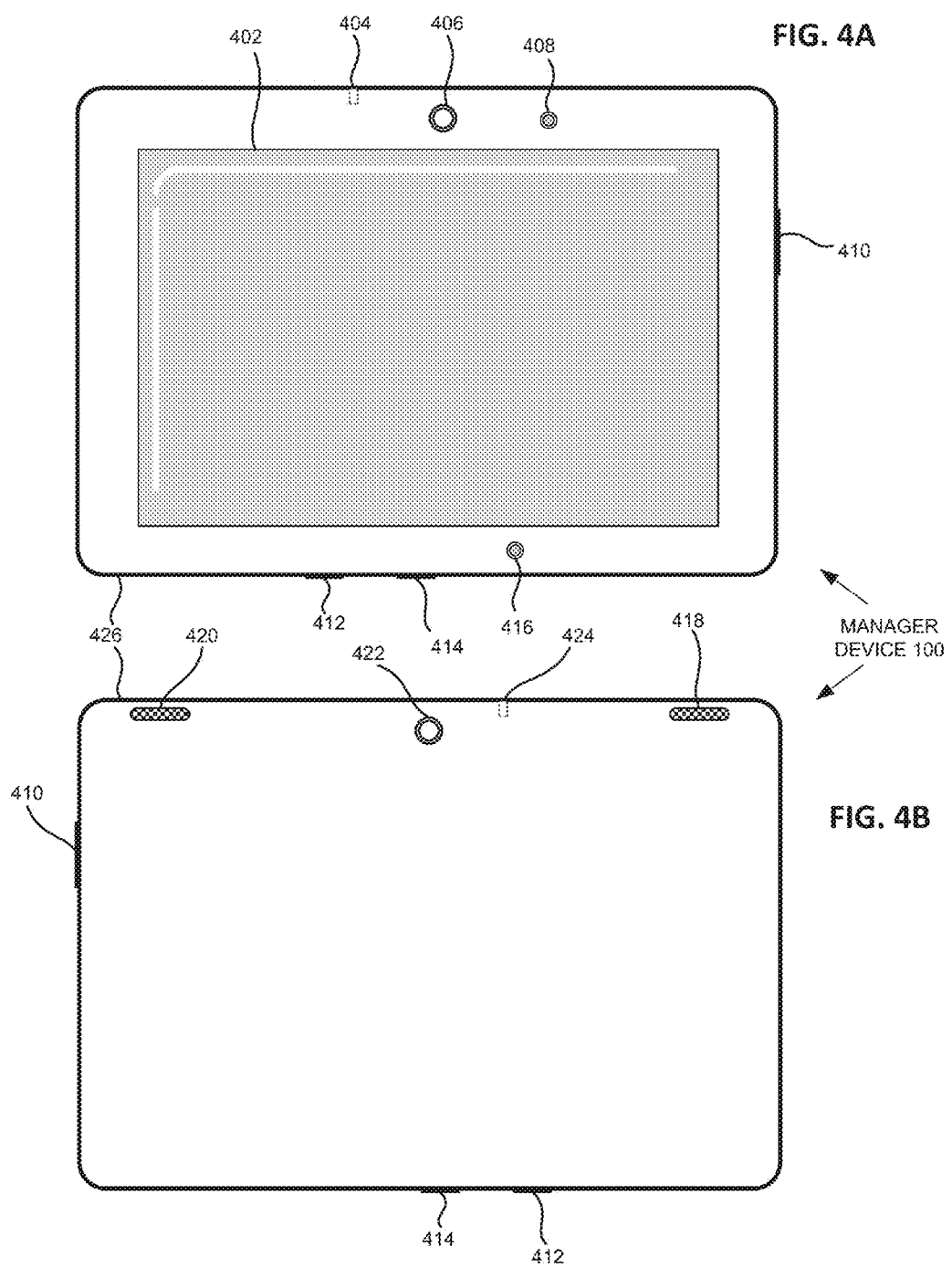

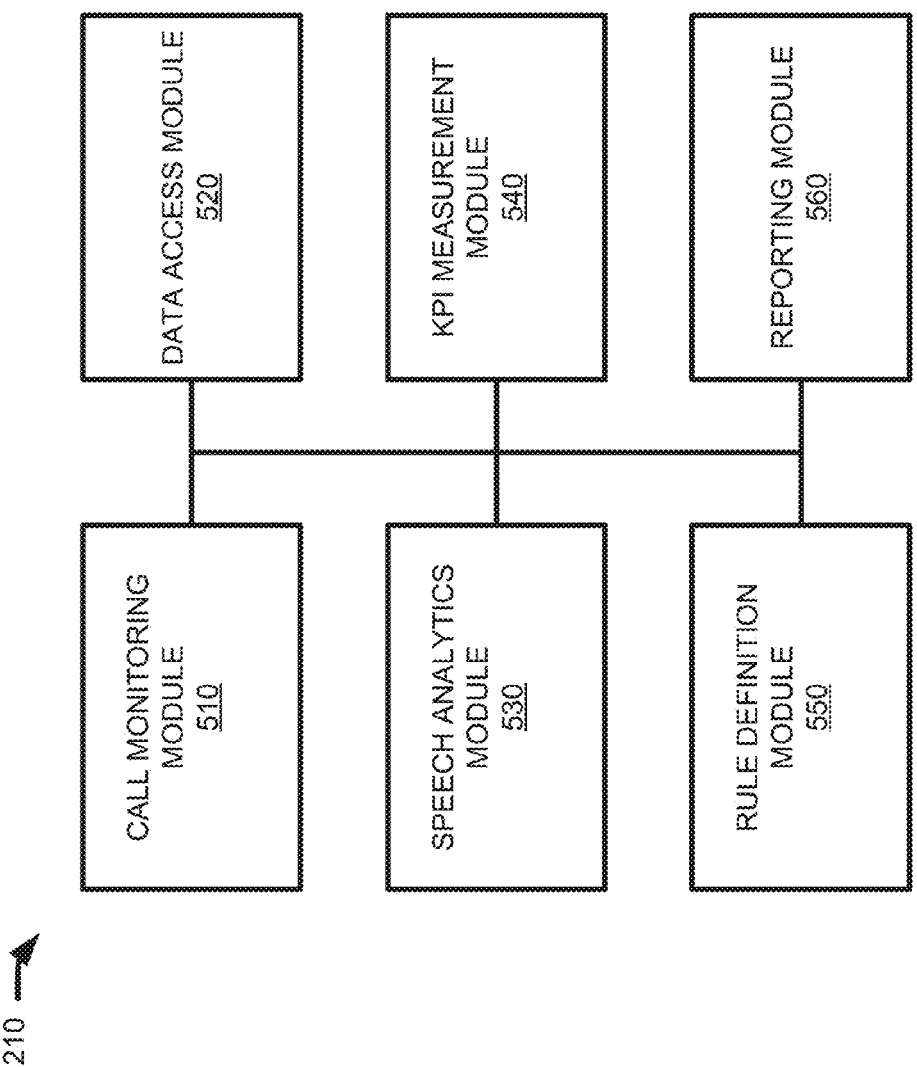

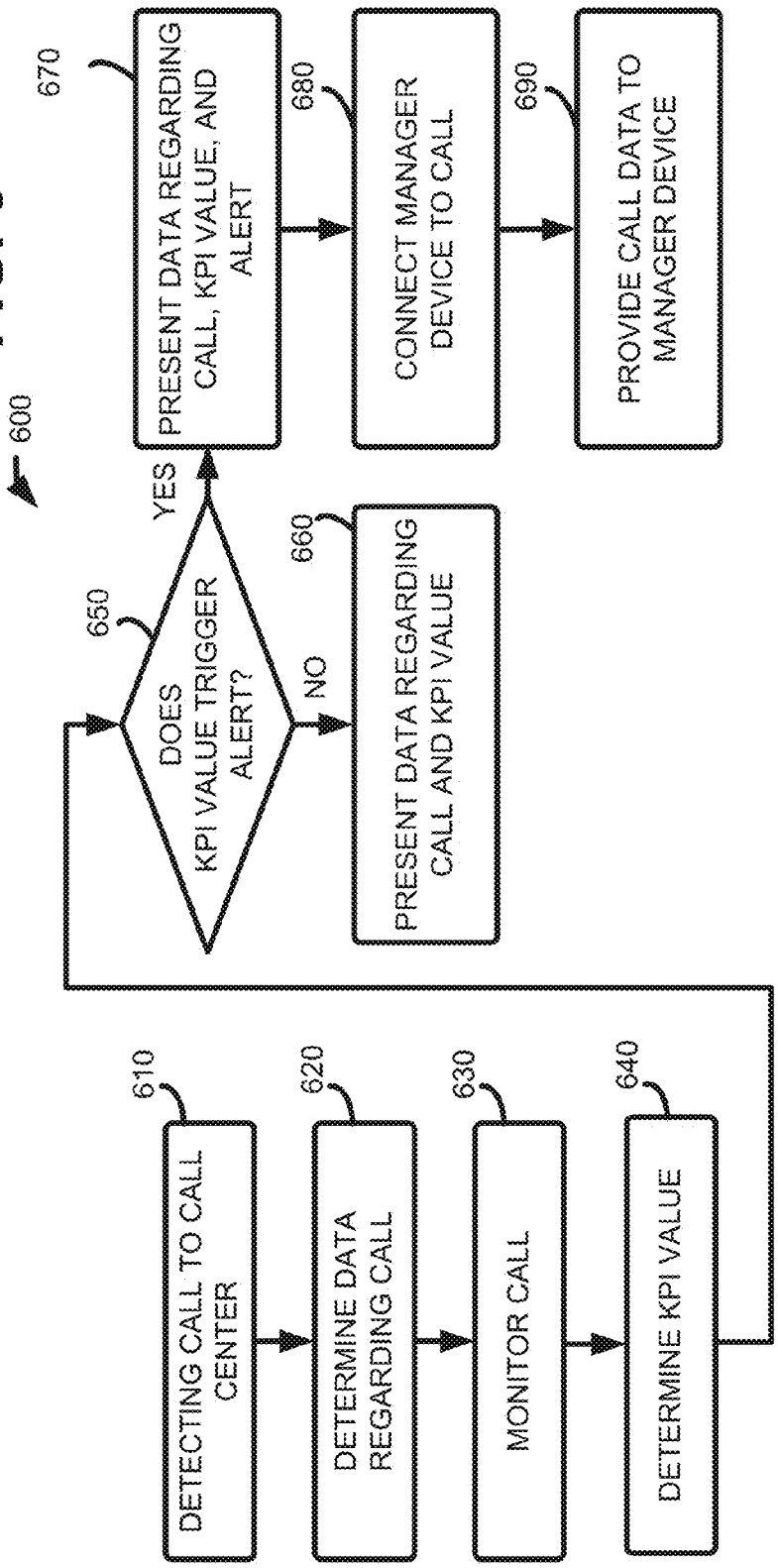

… …

CALL CENTER AGENT MANAGEMENT

BACKGROUND

Companies often use call centers to address customer inquiries, take customer orders and/or resolve customer problems. Agents, i.e., company personnel, at the call centers interact with the company's customers during telephone calls to provide assistance. The agents are often the companies' primary contact with customers, and dissatisfaction with the agents may adversely affect the customers' perception of the company.

BRIEF DESCRIPTION OF THE DRAWINGS

FIGS. 2A-2H show exemplary interfaces for monitoring call center agents in the environment shown in FIG. 1;

FIG. 3 shows exemplary components of the device which may be replicated for usage in multiple instances in the environment depicted in FIG. 1;

FIGS. 4A-4B shows exemplary components of a manager device included in the environment depicted in FIG. 1;

FIG. 5 shows a schematic representation of the call monitoring device included in the environment depicted in FIG. 1; and FIG. 6 shows a flow chart of an exemplary process for monitoring call center agents within the environment shown in FIG. 1.

DETAILED DESCRIPTION

Figure 1:
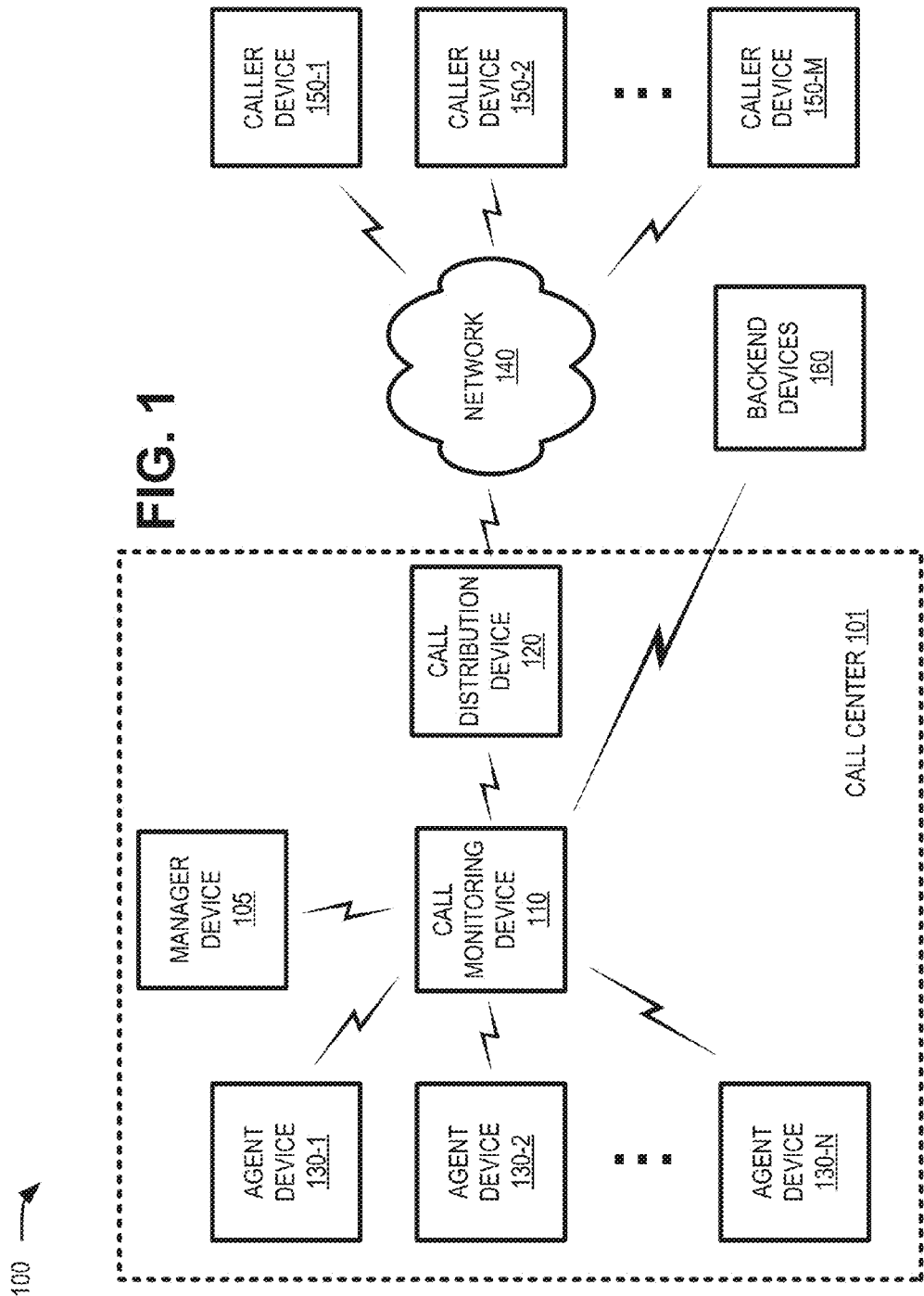
FIG. 1 shows an exemplary environment in which systems and/or methods described herein may be implemented.

The following detailed description refers to the accompanying drawings. The same reference numbers in different drawings may identify the same or similar elements.

In systems and methods described herein, call center agents may be monitored and information from monitoring the call center agents may be presented to a portable device used by an agent manager whose responsibility is, at least, to effectively supervise and mentor the agents. The information from monitoring the call center agents may include various key performance indexes (KPIs) that enable the manager to judge the performance of a group of call center agents. The KPIs may be updated in near-real time based on monitoring current calls. In another example, sound analytics may be performed to identify words spoken during the calls and these words may be analyzed to determine data regarding the call and/or to assess the call agents' performances.

Furthermore, information regarding the call center agents may be graphically organized by the portable device so that call centers agents who may need assistance (e.g., an agent with one or more KPI values that are outside of desired parameters) may be easily identified. The portable device may request to join a call (e.g., based on a user input) or the portable device may be automatically added to a call associated with an agent identified as possibly needing assistance. For example, a setting for a session associated with the call may be modified to include the manager device in the session.

FIG. 1 shows an exemplary environment 100 in which systems and/or methods described herein may be implemented. As illustrated in FIG. 1, environment 100 may include, for example, a call center 101 that includes a call monitoring device 110 that monitors calls to the call center and forwards monitoring results to manager device 115 for display (e.g., in interface 201 in FIGS. 2A-2H). Call center 101 may further include a call distribution device 120 that forwards calls received by call center 101 to agent devices 130 (shown in FIG. 1 as agent devices 130-1, 130-2, ..., 130-N) via call monitoring device 110. Call center 101 may receive the calls via network 140 from caller devices 150 (shown in FIG. 1 as caller device 150-1, 150-2, ..., 150-M). Environment 100 may further include one or more backend devices 160 that store data that may be accessed by monitoring device 110, such as caller account data.

Call monitoring device 110 may monitor a call between agent device 130 and caller device 150. For example, call monitoring device 110 may identify a particular agent device 130 and a particular caller device 150 associated with a call. Call monitoring device 110 may further monitor a status of the call (e.g., whether a session carrying data associated with the call is still active). Call monitoring device 110 may further calculate KPIs based on the data obtained from monitoring the calls. When the call is associated with digital data, call monitoring device 110 may inspect the data units carrying the voice data (e.g., voice over internet protocol, or VoIP, packets) and forward the voice data toward the particular agent device 130 or the particular caller device 150 associated with that call. For example, call monitoring device 110 may determine the particular agent device 130 and the particular caller device 150 based on routing data included in the header of the voice data.

In one implementation, call monitoring device 110 may perform speech analytics when monitoring the call. When performing the speech analytics, call monitoring device 110 may identify words used during the call using, for example, speech-to-text conversion. Call monitoring device 110 may further determine if some of the words spoken during the call indicate dissatisfaction and/or frustration by the caller. For example, call monitoring device 110 may store a list of particular words indicating dissatisfaction and/or frustration and may determine whether any of the particular words are spoken during the call. The list of particular words may vary, for example, based on the geographic location of the caller and/or based on the products and services associated with the caller. If the call is carried over a communications signal, call monitoring device 110 may also determine attributes of the communications signal (e.g., a maximum amplitude, variance etc.). For a call carried over a digital channel (e.g., an internet protocol, or IP, communication), call monitoring device 110 may analyze data carried in data units of the digital channel (e.g., in IP packets) to determine the words of the call. For example, call monitoring device 110 may decode audio (e.g., vocal) content stored in the data units and determine the words included in the audio content.

Manager device 115 may include a portable device, such as a tablet computer, that provides a call center manager with information regarding agents located at a call center while allowing the manager to move about the call center to interact with individual agents when desired, such as when an agent is having difficulties with a call. Manager device 115 may include, for example, a personal communications system (PCS) terminal (e.g., that may combine a cellular radiotelephone with data processing and data communications capabilities), a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, a portable media player, a consumer electronics device, or other types of computation or communication devices.

Call distribution device 120 may distribute calls received at call center 101 to one of agent devices 130. For example, call distribution device 120 may forward an incoming call to an available one of the agent device 130. In another implementation, call distribution device 120 may identify a caller, a topic, or other aspects of an incoming call and may forward the call to an appropriate agent device 130. For example, call distribution device 120 may be associated with an IVR system (not shown) that asks the caller questions to identify information regarding the caller and the nature of the call.

In one example, call distribution device 120 may determine information regarding the agent, such as KPIs or other measures, such as ratings provided by a manager and/or callers and may distribute the incoming calls based on the information regarding the agent. For example, call distribution device 120 may attempt to forward the call to the highest performing agent that is available to receive the call.

In one implementation, call distribution device 120 may perform session management to establish a data or communications session (e.g., a SIP session) between agent device 130 and caller device 150 via network 140 for establishing the call. When managing a call session, call distribution device 120 may establish the session to include monitoring device 110 so that monitoring device 110 may receive information (e.g., voice data) related to the call. When appropriate (such as when a corresponding user input is received by manager device 115), the session may be further modified to allow manager device 115 to interact with the agent and/or caller.

Agent device 130 may represent a workstation/computer and operator used to handle calls from callers. Agent device 130 may include a workstation or computer, such as a personal computer or laptop. Agent device 130 may also include any device capable of performing IP based messaging, such as VoIP, to transmit voice, video and/or text. Agent device 130 may also include any telephone device (not shown) to place and receive telephone calls. For example, the telephone device may be a standard telephone, a cordless telephone, a cellular telephone or any other type of telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device. In some implementations, agent device 130 may include speech recognition hardware/software that receives voice responses from a caller and identifies what the caller has voiced.

Network 140 may be a communications network and/or data network that connect caller devices 150 to call center 101. For example, network 140 may include a local area network (LAN), a wide area network (WAN), a metropolitan area network (MAN), a wireless network, an optical fiber (or fiber optic) network, or a combination of these or other networks. In addition or alternatively, network 140 may be included in a radio network capable of supporting wireless communications to/from one or more devices in environment 100, and the radio network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 1000 (CDMA2000), High-Speed Packet Access (HSPA), Worldwide Interoperability for Microwave Access (WiMax), enhanced high-rate packet data (eHRPD), or a network implemented in accordance with future wireless network standards. In another implementation, network 140 may be included in one or more private Internet Protocol (IP) networks that use a private IP address space. For example, network 140 may be included a local area network (LAN), an intranet, a private wide area network (WAN), a virtual private network (VPN), etc.

Caller device 150 may include any type of communication or computation device that is capable of transmitting and receiving voice signals and/or data to/from a network, such as network 140. For example, caller device 150 may include any standard telephone, cordless telephone, cellular telephone, or other type of conventional telephone that interfaces with a public switched telephone network (PSTN) and/or wireless network to place and receive telephone calls. Caller device 150 may also include any client, such as a computer device, a web-based appliance, etc., that is configured to provide telephone functions using, for example, voice over Internet protocol (VoIP), H.323 protocol, etc. For example, caller device 150 may include a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer or other computing device.

Caller device 150 may further include any type of communication or computation device, such as a PC, laptop computer, tablet computer, personal digital assistant, cell phone, etc., that is capable of transmitting data (e.g., emails, text messages, instant messages, facsimiles, etc.), video data (e.g., video calls, video chats, video messages, etc.) and/or voice data (e.g., voice calls) to/from a network, such as network 140.

Backend devices 160 may include devices that generate and/or manage data regarding agents (e.g., employment records), callers (e.g., account data) and/or other data used by monitoring device 110, and monitoring device 110 may include one or more application programming interface (APIs) that allow monitoring device 110 to access data through backend devices 160. For example, backend device 160 may include a human resources device that stores data about an agent and/or a client account device that stores data regarding the status or other information about a caller's account.

In FIG. 1, the particular arrangement and number of components of environment 100 are illustrated with simplicity for purpose of illustration. In practice, environment 100 may include additional, fewer, and/or different components. Furthermore, functions described as being performed by a component in environment 100 may be performed by a different component and/or by multiple components in environment 100. For example, manager device 115 may perform some of the call monitoring functions described above with respect to monitoring device 110.

FIGS. 2A-2H show an exemplary interface 201 (shown in FIGS. 2A-2H as interfaces 201-A to 201-H), that may be presented by a manager device 115 in connection with managing agents in call center 101 in certain implementations. As described in greater detail below, interfaces 201 may enable a user of manager device 115 to determine the status of the agents and calls being handled by the agents in near real-time, to measure the performance of the agent in one or more KPIs, and to enable the manager to take appropriate actions based on the determined status and the measured KPIs.

As shown in FIG. 2A, an exemplary interface 201-A may include an area presenting agent data 210 regarding an agent at the call center. Agent data 210 may include, for example, an agent image 210-A, an agent name 210-B, an agent title 210-C, etc. associated with the agent. Agent data 210 may be collected by manager device 115. For example, manager device 115 may include one or more cameras (shown in FIGS. 4A and 4B as front camera 406 and rear camera 422) to collect agent image 210-A. Additionally or alternatively, manager device 115 may determine agent data 210 based on user input and/or data received from another device (e.g., a backend device 160 in FIG. 1 that stores human resources data).

Interface 201-A may further include an area to present agent status data 220 regarding a status of the agent, such as an indication of whether the agent is on a call 220-A, whether the agent is on a break (e.g., unable to take a call) 220-B, etc. Manager device 115 may determine agent status data 220 based on data received from other devices. For example, manager device 115 may receive an indication from a device being used by the agent (e.g., shown in FIG. 1 as agent device 130) and/or from a device distributing calls to the agent (e.g., shown in FIG. 1 as call distribution device 120) regarding whether the agent is accepting calls (e.g., not on a break) and/or whether the agent is currently handling a call.

Continuing with FIG. 2A, an exemplary interface 201-A may include an area presenting caller data 230, such as a caller identifier (ID) 230-A (e.g., the caller's name, telephone number, and/or account number), and account data 230-B associated with the caller (e.g., products and services associated with the caller's account). Manager device 115 may determine the caller ID 230-A from a device handling distribution of the call within the call center (e.g., call distribution device 120), and manager device 115 may use caller ID 230-A to access account data 230-B from a customer account data storage device (e.g., backend device 160). In one implementation, caller data 230 may further identify products and/or services that are available to the caller but are not associated with the caller's account (e.g., products and services that may be offered to the caller). In another example, caller data 230 may provide information regarding the caller's location, such as providing an indication of any service disruptions at the caller's location or an indication of attributes of the caller's location (e.g., whether the caller is calling from a business or residence, whether a residence is a single family home or a multiunit dwelling, etc.).

Interface 201-A may also include an area presenting call data 240, such as a call length 240-A (e.g., an amount of time that agent has been speaking with the caller), a call type 240-B (e.g., whether the call is a request for technical support, an inquiry regarding new goods or service, a request to change existing goods or service, etc.), and/or an indication 240-C of whether the call is a repeat call (e.g., the caller is calling back after a prior, unsuccessful call). Call data 240 may be collected from inputs received by the agent (e.g., an input received by agent device 130 in FIG. 1) and/or distributed to the agent (e.g., from call distribution device 120 in FIG. 1). For example, when a call is initially received, the caller may be asked (e.g., by an interactive voice response, or IVR, system) questions regarding the caller and/or the nature of the call. In one implementation, interface 201-A may present graphical indicators representing call data 240. For example, if call type 240-B indicates that the call is an inquiry regarding new goods or service, a money symbol may be displayed.

In one implementation, the call may be monitored (e.g., by call monitoring device 110 in FIG. 1) to determine features of the call. For example, sound analytics may be used to evaluate the conversation between the caller and the agent. For example, speech-to-text processing may be used to determine some of the words used during the call, and these words may be processed to identify call type 240-B (e.g., by identifying whether certain words related to technical support or sales are used during the call). In another example, the words from the call and/or other aspects of the call (e.g., the volume of the speakers, the numbers of words spoken, the number and duration of pauses, etc.) may be evaluated to determine a mood of the agent and/or caller (e.g., to determine whether the caller has used language during the call indicating satisfaction and/or dissatisfaction with the agent). For example, the call may be monitored to determine if the caller asks to speak with a supervisor and/or asks to discontinue a product and/or service.

Interface 201-A may also include an area presenting alerts 250 that may be determined cased on the call data 240 and/or other data collected by manager device 115. For example, a user of manager device 115 may define certain alert conditions (e.g., a maximum amount of break time, a maximum call length, etc.), and alerts 250 may indicate whether any of the alert conditions are present with respect to the agent, the caller, and/or the call. For example, alerts 250 may include an indication 250-A of whether the call length is too long (e.g., whether call length 240-A has exceeded a threshold length of time). Alerts 250 may also provide an indication of an agent failure to successfully handle the call 250-B (e.g., the agent could not complete a sale or resolve a technical issue). Alerts 250 may also provide an indication, based on caller's mood 240-C, when the caller is unhappy with the agent 250-C (e.g., if the caller has used language during the call indicating dissatisfaction and/or frustration with the agent).

Continuing with FIG. 2A, interface 201-A may further include data identifying actions 260 that are available to the manager with respect to the agent and/or call. For example, a view KPIs action 260-A may allow the manager to view KPIs measured for the agent and/or call (as described in greater detail below regarding FIGS. 2B and 2C). A join call action 260-B may allow the manager to take over and/or join the call (as described in greater detail below regarding FIG. 2D), such as to intervene when one or more of the KPIs indicated that the call is not going well (e.g., if the call-length is too long and/or the caller is dissatisfied). A view call history action 260-C may allow the manager to view a call log identifying information regarding prior calls handled by the agent and/or received from the caller (as described in greater detail below regarding FIG. 2E). A view tasks action 260-D may allow the manager to view tasks to be performed by the agent and/or on behalf of the caller (as described in greater detail below regarding FIG. 2F).

A view training data action 260-E may present training suggestions for the agent associated with the call, based on the measured KPIs. For example, if the call length exceeds a desired maximum time, selection of view training data action 260-E may provide training materials directed to training the agent to complete the call in a shorter time, and contents of the training materials may be populated based on call data 240 (e.g., such as type of call 240-B). Other actions 260 (not shown in FIG. 2A) may relate to, for example, communicating with the agent or transferring the call to another agent.

Manager device 115 may select actions 260 from a group of possible actions data presented within interface 200-A. For example, the joining the call action 260-B may be presented when one or more of alerts 250 indicate a problem with the agent's handling of the call (e.g., an excessive call length alert 250-A).

As shown in FIG. 2B, an exemplary interface 200-B may show KPIs values/results related to the agent, caller, and/or current call. For example, interface 200-B may show an average call length 270-A corresponding to an average length of prior calls handled by that agent, received from the caller, and/or belonging to the call type 240-B. In this way, manager device 115 may help a user of manager device 115 to determine, for example, that an agent, although call duration 240-A is within an acceptable range, may need assistance because call duration 240-A exceeds an average call duration 270-A for the agent and/or the type of call. Similarly, if call duration 240-A is outside of the acceptable range but does not exceeds a higher average call duration 270-A associated with a particular caller, manager device 115 may determine that the agent does not need assistance.

Continuing with FIG. 2B, interface 201-B may further show, for example, information identifying a percentage of calls resolved by the agent 270-B, such as the percentage of sales inquiries successfully handled by the agent (e.g., calls that lead to an actual order) and/or a percentage of technical support requests that were resolved by the agent without requiring dispatching a technical support worker to visit the caller. Similarly, interface 201-B may further show, for example, information identifying a percentage of repeat callers 270-C (e.g., callers that called back to the call center after being assisted by the agent, indicating that the callers were not satisfied with the support initially received from the call center). In other examples (not shown in FIG. 2B), a KPI 270 may compare agent status data 220, call data 240, etc. for several agents, such as comparing current average call lengths among a group of agents. The KPIs may be specific to the agents identified in interface 201-B. For example, if interface 201-B identifies a group of agents, average call length 270-A may correspond to an average length of prior calls handled by the group of agents.

In one implementation, KPIs 270 may be product and/or service specific. For example, if a call center agent handles calls related to communications services and data services, one set of KPIs 270 may be determined for communications services and a second set of KPIs 270 may be determined for data services.

Referring now to FIG. 2C, an exemplary interface 201-C may show values of KPI trends 275. For example, interface 201-C shows exemplary KPI trends 275-A to 275-C that correspond to changes over time in average call length 270-A, percentage of resolved calls 270-B, and percentage of repeat callers 270-C. The KPIs may be specific to the agents identified in interface 201-C. For example, if interface 201-C identifies a particular group of agents, average call length trends 275-A may correspond to changes in average call length in prior calls handled by that particular group of agents.

Manager device 115 may determine KPIs 270 and/or KPI trends 275 based on data collected by monitoring calls (e.g., collected by call monitoring device 110). In one implementation, manager device 115 may determine and/or update KPIs 270 and KPI trends 275 in near real time based on call data 240. For example, manager device 115 may update average call length 270-A and average call length trend 275-A based on call length 240-A of the current call.

As previously described with respect to FIG. 2A, one possible action that may be implemented via manager device 115 is to join a call 260-B. For example, if session management is performed to establish a call to the agent (e.g., agent device 130 in FIG. 1), the session settings may be adjusted so that manager device 115 is included in the session, and manager device 115 can be used to listen to and/or speak during the call.

As shown in FIG. 2D, an exemplary interface 201-D may present additional call information 280 related to the call. Interface 201-D may present additional call information 280 when action 260-B (FIG. 2A) to join a call is selected. For example, manager device 115 may present a call transcript 280-A, a list of actions taken by the agent with respect to the call 280-B, and/or additional call data 280-C that might assist the user of manager device 115 when joining the call. Additional call data 280-C may include, for example, recommendations/training materials that are generated, based on the KPIs and/or other data, to improve the agent's performance. Call transcript 280-A may be generated based on performing speech analytics when monitoring the call (e.g., by monitoring device 110). In another example, call transcript 280-A may include a recording of one or more portions of the call. The portions that are recorded and/or transcribed may correspond to portions of the call identified (e.g., based on speech analytics) to be problematic. For example, portions of the call associated with frustration by the caller and/or agent may be automatically identified, transcribed, and/or recorded. These sections of the call may be presented to the agent to improve training by identifying mistakes made by the agent that may have led to an alert. For example, if the call length 240-A is too long, the stored portions may identify times when the agent spoke too slowly and/or spoke too much.

Actions taken by the agent with respect to the call 280-B and/or additional call data 280-C may be populated based on input provided by the agent (e.g., via agent device 130 in FIG. 1). In another example, actions taken by the agent with respect to the call 280-B and/or additional call data 280-C may be determined from other devices. For example, actions taken by the agent with respect to the call 280-B and/or additional call data 280-C may reflect changes to the callers account and/or scheduled technical support visits (as determined from backend devices 160 in FIG. 1).

FIG. 2E shows an exemplary interface 201-E that may present a prior call log 290 when, for example, view call history action 260-C is selected. Prior call log 290 may present prior call information 292 regarding prior calls (e.g., other calls handled by the agent and/or associated with the caller). Prior call log 290 may include, for example, data identifying a time of the call 292-A, a call type associated with the prior call 292-B (e.g., whether the prior call was for technical support, new sales, and/or modifying an existing product and/or service associated with the caller), a length of the prior call 292-C, and/or an indication of whether the prior call was successfully resolved 292-D. The user of manager device 115 may use the call log 290 to better assist the agent. For example, if call log 290 indicates that an agent has a low success rate for a particular type of calls (e.g., if an agent rarely resolves technical issues for certain types products), the user of manager device 115 may be more pro-active to assist the agent when the agent is assigned a new call of the particular type.

FIG. 2F shows an exemplary interface 201-F that may present an agent task list 295 when, for example, view task list action 260-D (FIG. 2A) is selected. Agent task list 295 may present a list of tasks to be performed by the agent (e.g., commitments made by the agent during a prior call). For example, a task identified in agent task list 295 may relate to scheduling a technical support visit to the caller for installing a new product and/or repairing equipment being used by the caller. As shown in FIG. 2F, agent task list 295 may include a call identifier 297-A identifying a call associated with a task (e.g., identifying a caller and time of the call). Agent task list 295 may also include a task summary 297-B identifying actions to be performed by the agent for the call (e.g., scheduling the technical support visit), a task status 297-C identifying a status of the task (e.g., indicating whether the task is completed and/or identifying a completed portion of the task). Agent task list 295 may further include a deadline 297-D for completing a task. Information in agent task list 295 may be collected, for example, from devices associated with agents (from agent device 130 in FIG. 1).

As shown in FIG. 2G, an exemplary interface 201-G may provide information regarding multiple agents. For example, interface 201-G may present agent data 210-1 and agent data 210-2, such as to present images 210-A (FIG. 2A) of the different agents. Interface 201-G may further present agent status data 220-1 and 220-2 associated with the different agents (e.g., to provide an indication 220-A (FIG. 2A) of whether one of the agents is available to handle an incoming call). Interface 201-G may also present caller data 230-1 and 230-2 and call measurements 240-1 and 240-2 for calls being handled by the different agents. Interface 201-G may also present alerts and/or notifications 250-1 and 250-2. For example, interface 201-G may present data regarding different alerts and/or notifications 250-1 and 250-2 associated with different users.

In one implementation, interface 201-G may graphically distinguish the agents. For example, data in interface 201-G may graphically identify (e.g., visually highlight) an agent associated with an alert/notification 250. For example, agent data 210 regarding the agent associated with a particular alert may be presented in a particular color, brightness, and/or position within interface 201-G.

In one implementation, interface 201-G may identify agents grouped into a virtual team (as opposed to a group of agents). A user or other person (e.g., a supervisor) may group various individual agents in one or more virtual teams. In another example, two or more agents may be dynamically grouped into a virtual team based on one or more factors. For example, agents may be grouped into a virtual team based on function (e.g., retention agents vs. sales agents), performance (e.g., low performing agents vs. high performing agents) shifts (e.g., daytime agents versus evening agents). The virtual teams may be updated periodically (e.g., each minute, each hour, each day, etc.) or may be dynamically generated/updated based on a triggering event (e.g., one or more KPIs for a group fails to satisfy a threshold).

As a result, KPIs and alerts are also aggregated at the level of these virtual teams in a similar way to how they would show up for an individual. This view help a user of manager device 105 to more effectively manage a team of agents. Example of aggregate KPI at a team level may include, for example, average break time, total received qualified calls, average team Close Rate, etc. Example of collective alerts at a virtual team level may include a quantity of ongoing disconnect calls, a quantity of customer escalation requests, etc.

Various actions enabled through manager device 105 may be implemented at a virtual team level. For example, a user may send (e.g., broadcast) a notification to every member of a virtual team, e-mail the virtual team members, record calls of the virtual team members, bookmark calls of the virtual team members, etc.

As shown in FIG. 2H, an exemplary interface 201-H may show different KPI values for different agents (e.g., the agents identified in FIG. 2G). For example, interface 201-H may show an average call length 270-A-1 and 270-A-2 for the different agents, percentages of calls successfully resolved by the different agents 270-B-1 and 270-B-2, and percentage of repeat callers 270-C-1 and 270-C-2 for the different agents.

In one example, interface 201-H may visually rank and/or distinguish the different agents based on the KPIs. For example, interface 201-H may present information regarding agents that have higher KPI measurements 270 (e.g., long average call times) relatively higher on (or on a left portion of) interface 201-H when rendered. In another example, interface 201-H may visually distinguish an agent (e.g., showing agent data 210 in a different color, brightness, and/or position) when a KPI 270 associated with the agent triggers an alert, such as when an average call length 270-A or percentage of repeat callers 270-C exceeds a threshold value, or when a percentage of calls successfully resolved by the different agents 270-B does not satisfy a threshold value. Continuing with this example, interface 201-H may receive an input from a user selecting one of the KPIs 270 and may visually rank the agents based on the selected KPI 270. For example, if a user selects call length 270-A, interface 201-H may sort the agents from highest to lowest current call length (e.g., identifying agents that may need immediate assistance).

In FIGS. 2A-2H, the particular arrangement and number of data in interface 201 are illustrated with simplicity for purpose of illustration. In practice, interface 201 may include additional, fewer, and/or different data. Furthermore, functions described as being performed by a component in interface 201 may be performed by a different component and/or by multiple components in interface 201.

FIG. 3 is a diagram illustrating exemplary components of a device 300 that may correspond to one or more of the components of environment 100, such as manager device 115, call monitoring device 110, call distribution device 120, agent device 130, an element of network 140 and/or caller device 150, backend device 160. Each of the components of environment 100 may be implemented and/or installed as a combination of hardware and software on one or more devices 300. As shown in FIG. 3, device 300 may include, for example, a bus 310, a processing unit 320, a memory 330, one or more input devices 340, one or more output devices 350, and a communication interface 360.

Bus 310 may permit communication among the components of device 300. Processing unit 320 may include one or more processors or microprocessors that interpret and execute instructions. In other implementations, processing unit 320 may be implemented as, or include, one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits a user to input information to device 300, such as a keyboard, a keypad, a mouse, a pen, a microphone, one or more biometric mechanisms, and the like. Output device 350 may include a device that outputs information to the user, such as a display, a speaker, etc.

Communication interface 360 may include any transceiver-like mechanism that enables device 300 to communicate with other devices and/or systems. For example, communication interface 360 may include mechanisms for communicating with other devices, such as other devices of environment 100. In one implementation, communication interface 360 may support short range wireless network communications (e.g., via Bluetooth® protocols). In other implementations, communication interface 360 may support other wired or wireless network communications.

As described herein, device 300 may perform certain operations in response to processing unit 320 executing software instructions stored in a computer-readable medium, such as memory 330. A computer-readable medium may include a non-transitory tangible memory device. A memory device may be implemented within a single physical memory device or spread across multiple physical memory devices. The software instructions may be read into memory 330 from another computer-readable medium or read into memory 330 from another device via communication interface 360. The software instructions stored in memory 330 may cause processing unit 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, differently-arranged components, or additional components than those depicted in FIG. 3. As an example, in some implementations, a display may not be included in device 300. In these situations, device 300 may be a "headless" device that does not include input device 340. Alternatively, or additionally, one or more components of device 300 may perform one or more other tasks described as being performed by one or more other components of device 300.

FIGS. 4A and 4B are, respectively, front and rear views of manager device 115 according to one implementation. As shown in FIGS. 4A and 4B, manager device 115 may include a display 402, a headset jack 404, a front camera 406, a notification indicator 408, power/sleep/volume key 410, a Universal Serial Bus (USB)/Power port 412, a high definition multimedia (HDMI) connector 414, a charging status indicator 416, speakers 418/420, a rear camera 422, a flash 424, and a housing 426.

Display 402 may provide visual information to the user. In one implementation, an upgrade client installed on manager device 115 may show the information via a graphical user interface (GUI). Headset jack 404 may include a plug into which one may attach speaker wires (e.g., headphone wires), so that electric signals from manager device 115 can drive the speakers, to which the speaker wires run from headset jack 404.

Front camera 406 may enable the user to view, capture, store, and process images of a subject in/at front of manager device 115. Notification indicator 408 may include a light emitting diode (LED) or another type of light source that blinks or turns on to indicate an incoming message (e.g., a text message, email, or call).

Power/sleep/volume key 410 may allow the user to place manager device 115 into a power-savings (e.g., "sleep" mode). If manager device 115 is already in the power-savings mode, triggering power sleep/volume key 410 may manager device 115 into an active mode. In this particular implementation, power/sleep/volume 410 may also be used to increase or decrease speaker volume.

USB/Power port 412 may allow power to be received by manager device 115, either from an adapter (e.g., an alternating current (AC) to direct current (DC) converter) or from another device (e.g., computer). HDMI connector 414 may allow manager device 115 to output HDMI signals.

Charging status indicator 416 may include a lamp or an LED for indicating that manager device 115 is being charged (e.g., charging status indicator 416 may blink or light up). Speakers 418/420 may provide audible information from manager device 115 to a user/viewer of manager device 115.

Rear camera 422 may enable the user to view, capture, store, and/or process images of a subject at the back of manager device 115. Flash 424 may include a lamp or an LED for providing light for rear camera 422. Housing 426 may provide a casing for components of manager device 115 and may protect the components from outside elements.

Although FIGS. 4A and 4B show exemplary components of manager device 115, in other implementations, manager device 115 may include fewer components, different components, differently-arranged components, or additional components than those depicted in FIGS. 4A and 4B. Alternatively or additionally, one or more components of manager device 115 may perform one or more other tasks described as being performed by one or more other components of manager device 115.

FIG. 5 shows exemplary components that may be included in call monitoring device 110 in one implementation. As illustrated in FIG. 5, call monitoring device 110 may include a call monitoring module 510, a data access module 520, a speech analytics module 530, a KPI measurement module 540, a rule definition module 550, and a reporting module 560.

Call monitoring module 510 may determine call data regarding a call between call center 101 and caller device 150. For example, call monitoring module 510 may determine agent device 130 and caller device 150 associated with a call and may determine when the call began. Call monitoring module 510 may further determine whether the call has been handled by multiple agents (e.g., by determining whether a different agent that have been previously included in a session carrying the call). Call monitoring module 510 may further include hardware/software to determine data regarding a call, such as to monitor a status of a session carrying the call. For example, monitoring module 510 may determine a length of a call based on the length that a corresponding session is active. In another example, call monitoring module 510 may interact with call distribution device 120 to receive information regarding the distribution of calls (e.g., receive a notification when a call is distributed to a particular agent device 130).

Data access module 520 may acquire information related to the call. For example, data access module 520 may include one or more APIs to access information regarding the caller and/or agent from backend devices 160. In another example, data access module 520 may interact with call agent device 130 and/or caller device 150 to receive information regarding a call, such as notes inputted by an agent via the particular agent device 130.

Continuing with FIG. 5, call monitoring device 110 may include speech analytics module 530. For example, speech analytics module 530 may determine some of the words used during the call and process these spoken words to identify call type 240-B. In another example, speech analytics module 530 may evaluate the words from the call and/or other aspects of the call (e.g., the volume (i.e., loudness) of the speakers, the numbers of words spoken, the number and duration of pauses, etc.) to determine the context of the call (e.g., whether the call is a request for technical support or is related to a potential sale). Speech analytics module 530 may analyze words and attributes of the call to determine a mood of the agent and/or the caller (e.g., to determine whether the caller has used language during the call indicating dissatisfaction with the agent).

As further shown in FIG. 5, a KPI measurement module 540 may use information received from call monitoring module 510, data access module 520, and/or speech analytics module 530 to determine quality measurements regarding the performance of the agent on the call or in a group of calls. For example, KPI measurement module 540 may determine information regarding the call (e.g., a start time) and may use this information to determine KPI statistics about the call, such as a current call length. In another example, KPI measurement module 540 may acquire/store information regarding prior calls associated with the agent and/or call and may use this information to determine other types of KPIs such as average KPI values for the historical call (e.g., an average call length for the prior calls) and/or trends in the KPIs (e.g., changes in the KPIs). In another example, KPI measurement module 540 may update the KPIs in real-time to reflect a current call, such as to modify an average call length to reflect the length of a current call.

In one implementation, KPI measurement module 540 may measure KPIS associated with agents grouped into a virtual team (as opposed to a group of agents). A user or other person (e.g., a supervisor) may group various individual agents in one or more virtual teams. In another example, two or more agents may be dynamically grouped into a virtual team based on one or more factors. For example, agents may be grouped into a virtual team based on function (e.g., retention agents vs. sales agents), performance (e.g., low performing agents vs. high performing agents) shifts (e.g., daytime agents versus evening agents). The virtual teams may be updated periodically (e.g., each minute, each hour, each day, etc.) or may be dynamically generated/updated based on a triggering event (e.g., one or more KPIs for a group fails to satisfy a threshold).

KPI measurement module 540 may aggregate KPIs and alerts at the level of these virtual teams in a similar way to how they would show up for an individual. This view help a user of manager device 105 to more effectively manage a team of agents. Example of aggregate KPI at a team level may include, for example, average break time, total received qualified calls, average team Close Rate, etc. Example of collective alerts at a virtual team level may include ongoing disconnect calls, customer escalation request, etc.

Rule definition module 550 may enable a user to define the KPIs. For example, rule definition module 550 may provide an interface to receive information from a user to define one or more KPIs and data used to define the KPIs. Rule definition module 550 may further allow a user to define desired values for the KPI and alert conditions (e.g., KPI values associated with alert conditions that may cause an agent to be graphically flagged, or distinguished, in interface 2 201 as potentially needing a manager's assistance with a caller).

Reporting module 560 may output data collected from monitoring the calls. For example, reporting module 560 may provide data to manager device 115 for generating interface 201. In one implementation, reporting module 560 may auto-populate coaching forms with data that a user of manager device 115 may use to record observations of agent performance for storage in a central coaching database to be used for coaching or mentoring purposes. For example, if an agent is associated with one or more calls that exceed a desired call length, reporting module 560 may generate coaching forms that indicate the extent that the agent is over the desired call length, and may provide suggestions for improving performance. Reporting module 560 may store information from the current call and/or historical calls, such as information identifying calls that exceeds a threshold time length and other information regarding the call, such as to identify the callers and/or the nature of the calls.

Reporting module 560 may provide various actions at a virtual team level. For example, a user may send (e.g., broadcast) a notification to every member of a virtual team, e-mail the virtual team members, record calls of the virtual team members, bookmark calls of the virtual team members, etc.

Although FIG. 5 shows exemplary components of call monitoring device 110, in other implementations, call monitoring device 110 may include fewer components, different components, differently-arranged components, or additional components than those depicted in FIG. 5. Alternatively or additionally, one or more components of call monitoring device 110 may perform one or more other tasks described as being performed by one or more other components of call monitoring device 110.

FIG. 6 is a flow chart of an exemplary process 600 for monitoring one or more agents in call center 101. In one implementation, process 600 may be performed by call monitoring device 110. In other implementations, process 600 may be performed by a different device or by multiple devices of environment 100, such as by call monitoring device 110 in combination with manager device 115. Process 600 is described with reference to components in environment 100 shown in FIG. 1.

As shown in FIG. 6, process 600 may include detecting a call between a caller and an agent (block 610). For example, monitoring device 110 may receive a message from call distribution device 120, a particular agent device 130, and/or a particular caller device 150 providing notification of the call. In addition or alternatively, information associated with the call may be routed between the particular agent device 130 and the particular caller device 150 via monitoring device 110. For example, monitoring device 110 may be included in a session carrying the call between the particular agent device 130 and the particular caller device 150.

Continuing with FIG. 6, process 600 may also include collecting data regarding the call (block 620). Call monitoring device 110 may receive information that is collected when initiating the call (e.g., from call distribution device 120). For example, call distribution device 120 may include an IVR system that asks the caller one or more questions to determine data associated with the call (e.g., to identify the caller and/or a purpose for the call), and monitoring device 110 may receive data associated with the caller's answers to the questions.

In another example, monitoring device 110 may collect information regarding the agent and/or caller. For example, monitoring device 110 may interface with backend devices 160 (e.g., via one or more APIs) to collect information regarding the caller and/or the agent. The information about the caller and/or the agent may include, for example, data regarding prior calls, such as measurements regarding the prior calls (e.g., lengths of the prior calls), and/or information regarding the nature and results of the calls (e.g., information identifying whether the prior calls related to technical support or sales, whether additional calls were needed to resolve issues, whether the prior calls where successful, etc.).

As shown in FIG. 6, process 600 may further include monitoring the call (block 630) and calculating one or more KPIs (block 640). For example, call monitoring device 110 may monitor a session associated with the call to determine a length or other attributes associated with the call. In another example, call monitoring device 110 may perform speech analytics to identify words used during the call and/or other attributes of the conversation between the caller and the agent. In another example, call monitoring device 110 may interface with agent device 130 to receive information inputted by the agent, such as notes taken by the agent and/or information regarding actions taken by the agent with respect to the call. In block 640, call monitoring device 110 may use data collected from monitoring the call to determine and/or update one or more KPIs. For example, call monitoring device 110 may determine a KPI value associated with the current call (e.g., a number of words spoken by the agent per unit of time) and update another KPI determined using data from prior calls (e.g., an average number of words spoken by the agent per unit of time during the prior calls). In this way, call monitoring device 110 may measure the agent's performance during a current call against the agent's performance in prior calls in order to better identify improvements/regressions in the agent's performance.

Continuing with FIG. 6, process 600 may further include determining if the KPI value triggers an alert (block 650). For example, an alert may be triggered if the KPI has a certain value (e.g., speech analytics shows that the caller is becoming frustrated, the agent does not successfully resolve the call, the caller calls back, etc.) or if the KPI does not satisfy a desired value or range of values (e.g., the call length is too long, more than a threshold number of the agent's calls are unsuccessful, etc.). In one implementation, the desired value and/or range of values associated with a KPI are determined based on prior calls associated with the caller and/or agent. For example, the call length of a current call may be compared to an average length of prior calls associated with the agent and/or caller. In this way, call monitoring device 110 may identify that a particular agent (e.g., a skilled agent that usually resolves calls relatively quickly) is potentially having difficulty on the call when the length of the current call is longer than an average length of other calls handled by the agent even if the current call length is relatively short.

If the KPI does not trigger an alert (block 650—No), call monitoring device 110 may present information regarding the call and the KPI value (block 660). Otherwise, if the KPI triggers an alert (block 650-Yes), call monitoring device 110 may present information regarding the call, the KPI value, and the alert (block 670). For example, call monitoring device 110 may provide information to manager device 115 that that enables manager device 115 to provide an interface 201 that includes agent status data 220, caller data 230, call data 240, and, alerts 250. Similarly, In one implementation, call monitoring device 110 may auto-populate coaching forms with data that a user of manager device 115 may use to record observations of agent performance for storage in a central coaching database during blocks 660 or 670. For example, if an agent is associated with one or more calls that exceed a desired call length, call monitoring device 110 may generate coaching forms that indicate the extent that the agent is over the desired call length, and may provide suggestions for improving performance. Reporting module 560 may store, to the coaching forms, information from the current call and/or historical calls, such as information identifying calls that exceeds a threshold time length and other information regarding the call, such as to identify the callers and/or the nature of the calls.

Continuing with FIG. 6, process 600 may further include connecting manager device 115 to the call when the alert is triggered (block 680). For example, if the call is being handled via a data and/or communications session between agent device 130 and caller device 150, monitoring device 110 may forward instructions to cause call distribution device 120 to modify the session setting to include manager device 115 in the session. For example, manager device 115 may be automatically added to a session when an alert is triggered (e.g., when the one or more KPIs are outside of desired ranges of values). In this example, call distribution device 120 may add manager device 115 to the session (e.g., agent device 130 continues to be active in the session) or manager device 115 may replace agent device 130 in the session (e.g., agent device 130 is removed from the session).

In connection with connecting manager device 680 to the call, process 600 may further include providing call data to manager device 115 (block 690). For example, as described above with respect to FIG. 2A, interface 201-A presented by manager device 115 may include call data 240 (e.g., call length 240-A, type of call 240-B, and whether the call is a repeat call 240-C), and manager device 115 may determine call data 240 based on information received from call monitoring device 110. In another example described above with respect to FIG. 2D, interface 201-D presented by manager device 115 may include additional call data 280 (e.g., call transcript 280-A, information identifying actions taken by the agent 280-B, and additional call data 280-C), and manager device 115 may determine additional call data 280 based on information received from call monitoring device 110.

Thus, in the systems and methods described herein, call center agents may be monitored and information from monitoring the call center agents may be presented by a portable manager device 115. The information from monitoring the call center agents may include various KPIs that enable a user of manager device 115 to easily assess the performance of a group of call center agents. The KPIs may be updated in near-real time based on monitoring pending calls. Furthermore, information regarding the call center agents may be graphically organized by manager device 115 so that call centers agents who may need assistance (e.g., an agent with one or KPI values that are outside of desired parameters) may be easily identified. Manager device 115 may request to join a call (e.g., based on a user input) or manager device 115 may be automatically added to a call associated with an agent identified as possibly needing assistance. For example, a setting for a session associated with the call may be modified to include manager device 115 in the session.

In the preceding specification, various preferred embodiments have been described with reference to the accompanying drawings. It should, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Also, while a series of blocks has been described with respect to process 600 in FIG. 6, the order of the blocks in process 600 may be modified in other implementations to include additional, fewer, and/or different blocks. Further, non-dependent blocks in processes 600 may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   detecting, by a processor, that a call session is established between a caller and a call center agent;
   acquiring, by the processor, caller data associated with the caller and agent data associated with prior calls handled by the call center agent;
   monitoring, by the processor, the call session to produce monitoring data;
   determining, by the processor, whether an alert condition is present in the call session based on at least one of the caller data, the agent data, or the monitoring data;
   forwarding, by the processor, the monitoring data to a portable device, wherein the portable device provides at least a portion of the monitoring data for display, and wherein the portable device further provides an indication of whether the alert condition is present in the call session; and
   causing, by the processor, the portable device to be added to the call session when the alert condition is present in the call session.

2. The method of claim 1, wherein monitoring the call session includes performing sound analytics on the call session to identify one or more words spoken during the call session, and wherein determining whether the alert condition is present in the call session includes determining whether the one or more words spoken during the call session indicate a dissatisfaction of the caller.

3. The method of claim 1, wherein monitoring the call session includes determining, based on the one or more words, a cause for the call session, and wherein determining whether the alert condition is present in the call session includes determining whether the call center agent successfully resolved the cause for the call session.

4. The method of claim 2, further comprising:
   determining additional information related to the call when the portable device is added to session, wherein the additional information includes at least one of a transcript of the call or information identifying one or more actions taken by the call center agent on behalf of the caller; and
   providing the additional information to the portable device.

5. The method of claim 2, wherein monitoring the call session includes determining a duration of the call session, and wherein determining whether the alert condition is present in the call session includes determining whether the duration of the call session exceeds a threshold value.

6. The method of claim 2, wherein caller data includes data associated with an account associated with the caller, and wherein acquiring the caller data includes accessing a back-end device that stores the data associated with the account.

7. The method of claim 2, wherein the agent data includes data associated with prior calls sessions handled by the call center agent, and wherein determining whether the alert condition is present in the call session is further based on comparing the monitoring data and the data associated with the prior calls sessions.

8. A device comprising:
   a memory configured to store instructions; and
   a processor configured to execute one or more of the instructions to:
      detect that a call session is established between a caller and a call center agent,
      acquire caller data associated with the caller and agent data associated with prior calls handled by the call center agent,
      monitor the call session to produce monitoring data,
      determine whether an alert condition is present in the call session based on at least one of the caller data, the agent data, and the monitoring data,
      forward the monitoring data to a portable device, wherein the portable device provides at least a portion of the monitoring data for display, and wherein the portable device further provides an indication of whether the alert condition is present in the call session, and
      cause the portable device to be added to the call session when the alert condition is present in the call session.

9. The device of claim 8, wherein the processor, when monitoring the call session, is further configured to:
   perform sound analytics on the call session to identify one or more words spoken during the call session, and
   wherein the processor, when determining whether the alert condition is present in the call session, is further configured to:
   determine whether the one or more words spoken during the call session indicate a dissatisfaction of the caller with the call center agent.

10. The device of claim 9, wherein the processor, when monitoring the call session, is further configured to:
    determine, based on the one or more words, a reason that the caller is contacting the call center agent, and
    wherein the processor, when determining whether the alert condition is present in the call session, is further configured to:
    determine whether the call center agent successfully resolved the reason that the caller is contacting the call center agent.

11. The device of claim 8, wherein the processor is further configured to:
    determine additional information related to the call when the portable device is added to session, wherein the additional information includes at least one of a transcript of the call or information identifying one or more actions taken by the call center agent on behalf of the caller, and provide the additional information to the portable device.

12. The device of claim 8, wherein the processor, when monitoring the call session, is further configured to:

determine a duration of the call session, and wherein the processor, when determining whether the alert condition is present in the call session, is further configured to:

determine whether the duration of the call session exceeds a threshold value.

13. The device of claim 8, wherein caller data includes data associated with an account associated with the caller, and wherein the processor, when acquiring the caller data, is further configured to access a backend device that stores the data associated with the account.

14. The device of claim 8, wherein the processor is further configured to:

generate a coaching form when the alert condition is present in the call session, wherein the coaching form includes a portion of the monitoring data that is associated with determining that the alert condition is present in the call session.

15. A non-transitory computer-readable medium configured to store instruction, the instructions comprising:

one or more instruction that, when executed by a processor, cause the processor to detect that a call session is established between a caller and a call center agent, acquire caller data associated with the caller and agent data associated with prior calls handled by the call center agent, monitor the call session to produce monitoring data, determine whether an alert condition is present in the call session based on at least one of the caller data, the agent data, or the monitoring data, forward the monitoring data to a portable device, wherein the portable device provides at least a portion of the monitoring data for display, and wherein the portable device further provides an indication of whether the alert condition is present in the call session, and cause the portable device to be added to the call session when the alert condition is present in the call session.

16. The non-transitory computer-readable medium of claim 15, wherein the one or more instruction further cause the processor, when monitoring the call session, to:

perform sound analytics on the call session to identify one or more words spoken during the call session, and wherein the one or more instruction further cause the processor, when determining whether the alert condition is present in the call session, to:

determine whether the one or more words spoken during the call session indicate a dissatisfaction of the caller with the call center agent.

17. The non-transitory computer-readable medium of claim 15, wherein the one or more instruction further cause the processor to:

determine additional information related to the call when the portable device is added to session, wherein the additional information includes at least one of a transcript of the call or information identifying one or more actions taken by the call center agent on behalf of the caller, and provide the additional information to the portable device.

18. The non-transitory computer-readable medium of claim 15, wherein the one or more instruction further cause the processor, when monitoring the call session, to:

determine a duration of the call session, and wherein the one or more instruction further cause the processor, when determining whether the alert condition is present in the call session, to:

determine whether the duration of the call session exceeds a threshold value.

19. The non-transitory computer-readable medium of claim 15, wherein the call center agent is included in a plurality of call center agents, and wherein the one or more instruction further cause the processor to:

compare determine status information associated with the plurality of call center agents, wherein the status information indicates whether each of the plurality of call center agents is on break, on a call session, or waiting to be linked to a call session, and determine whether any of the plurality of call center agents has been on break longer than a threshold length of time.

20. The non-transitory computer-readable medium of claim 19, wherein the one or more instruction further cause the processor to: determine performance metric values for the plurality of call center agents, and provide the performance metric values to the portable device, wherein the portable device.

* * * * *